United States Patent
Goebel

(10) Patent No.: US 8,372,556 B2
(45) Date of Patent: Feb. 12, 2013

(54) CONDUCTIVE POROUS SPACERS FOR NESTED STAMPED PLATE FUEL CELL

(75) Inventor: Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

(21) Appl. No.: 12/701,929

(22) Filed: Feb. 8, 2010

(65) Prior Publication Data

US 2011/0195332 A1 Aug. 11, 2011

(51) Int. Cl.
*H01M 8/02* (2006.01)
*H01M 8/04* (2006.01)
*H01M 8/10* (2006.01)

(52) U.S. Cl. ........ 429/481; 429/457; 429/508; 429/510; 429/514; 429/532

(58) Field of Classification Search .............. None
See application file for complete search history.

(56) References Cited

U.S. PATENT DOCUMENTS

| 6,423,439 | B1 | 7/2002 | Barton et al. |
| 6,974,648 | B2 | 12/2005 | Goebel |
| 7,291,414 | B2 | 11/2007 | Goebel et al. |
| 7,687,182 | B2 * | 3/2010 | Goebel et al. ............... 429/434 |
| 2007/0275288 | A1 | 11/2007 | Goebel et al. |
| 2008/0107944 | A1 * | 5/2008 | Goebel ..................... 429/26 |

* cited by examiner

*Primary Examiner* — Jonathan Crepeau
(74) *Attorney, Agent, or Firm* — Fraser Clemens Martin & Miller LLC; J. Douglas Miller

(57) ABSTRACT

A fuel cell having a pair of bipolar plates is provided. Each of the bipolar plates has a nested active area and a non-nested feed area which also may serve as active area. An electrolyte membrane is disposed between a pair of electrodes and a pair of diffusion medium layers. Each of the diffusion medium layers is disposed adjacent the nested active areas and non-nested feed areas of the bipolar plates. A porous, electrically conductive spacer is disposed between one of the diffusion medium layers and one of the bipolar plates. A fuel cell stack having the fuel cell is also provided.

20 Claims, 5 Drawing Sheets

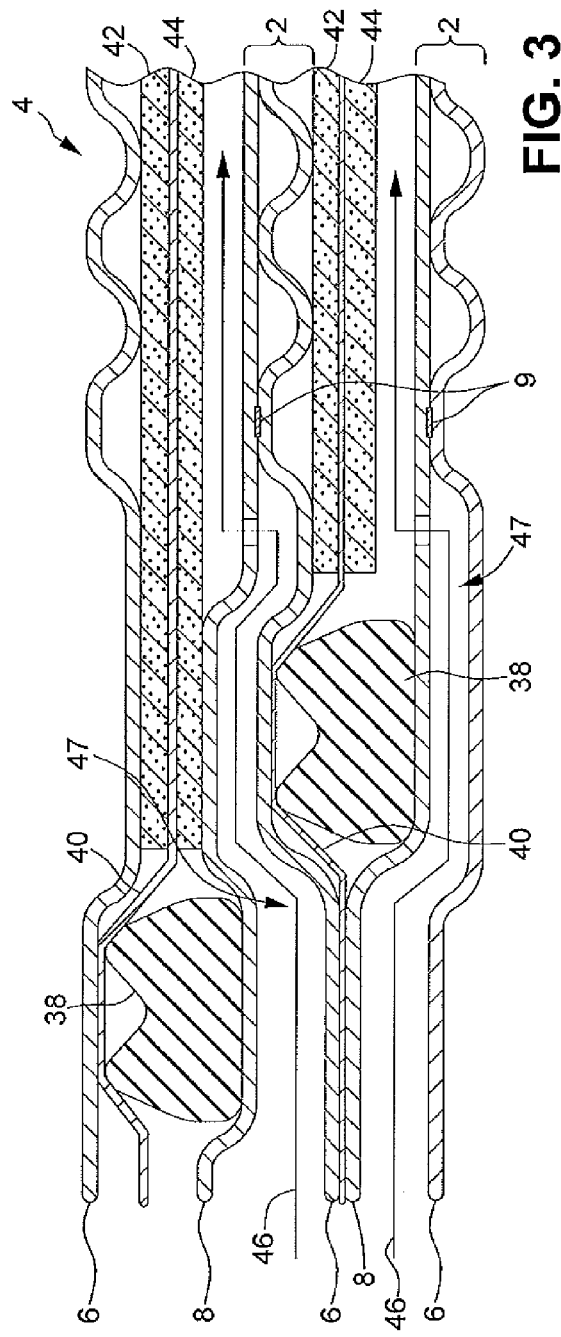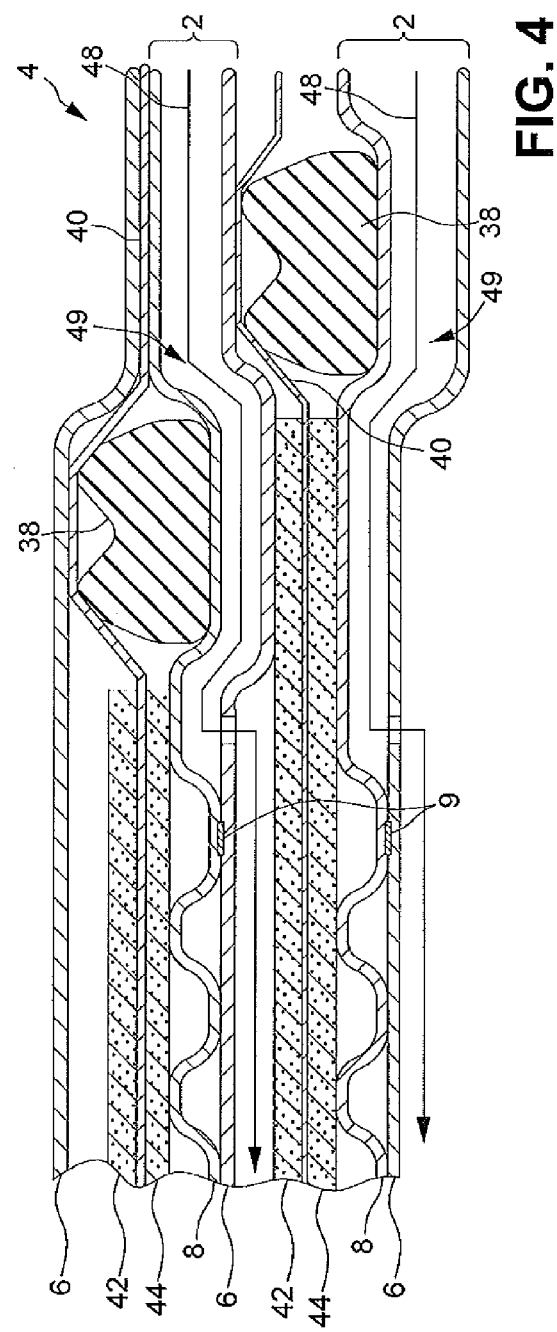

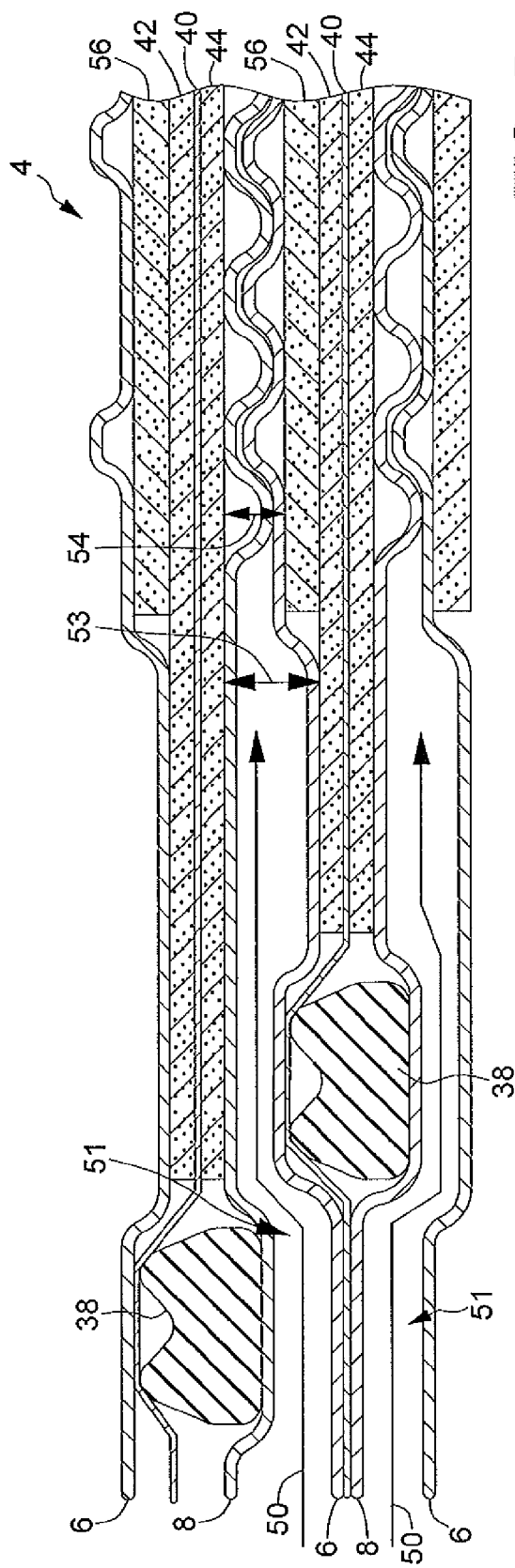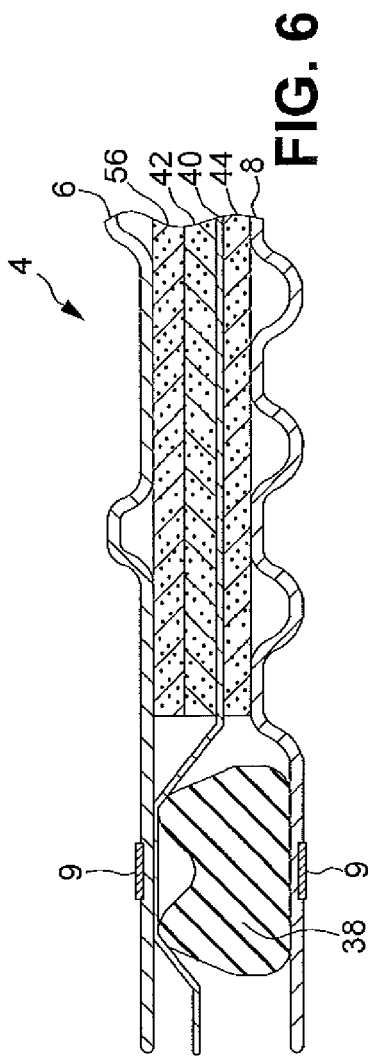

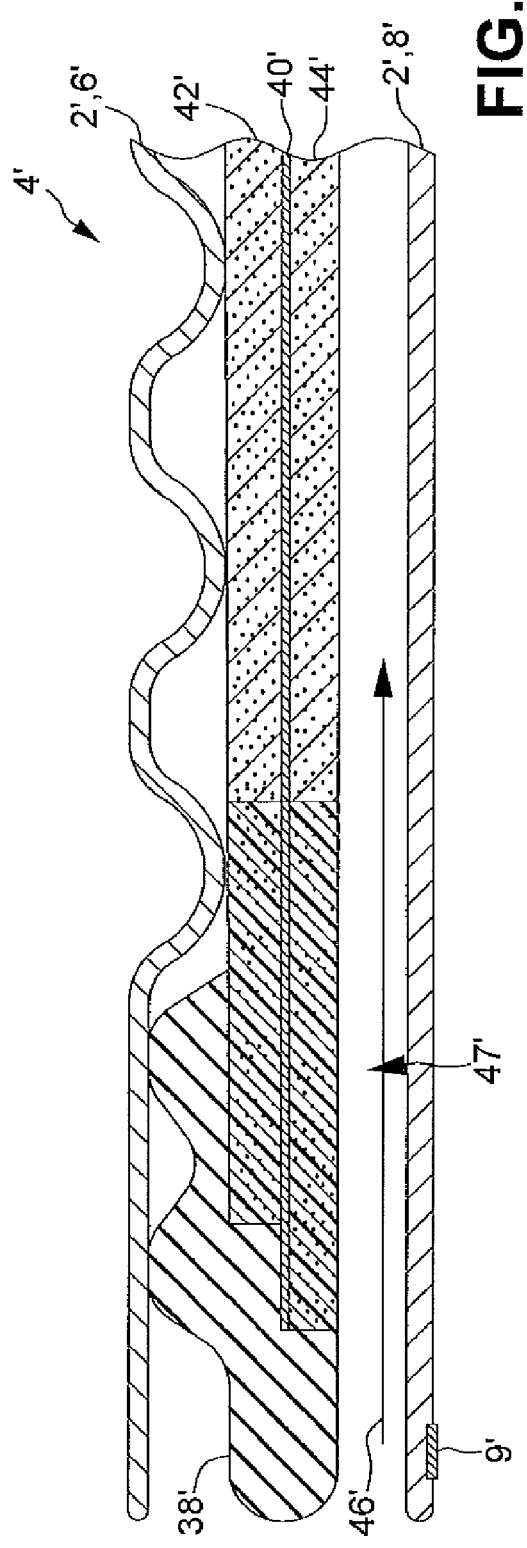
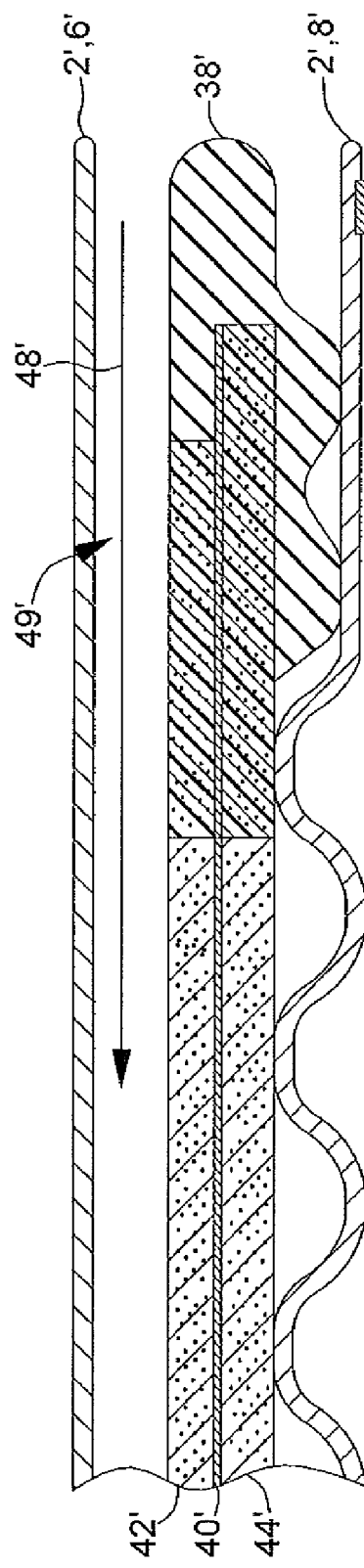

CONDUCTIVE POROUS SPACERS FOR NESTED STAMPED PLATE FUEL CELL

FIELD OF THE INVENTION

The invention relates to fuel cells, and more particularly to nested bipolar plates in fuel cells.

BACKGROUND OF THE INVENTION

Fuel cells can be used as a power source in many applications. For example, fuel cells have been proposed for use in automobiles as a replacement for internal combustion engines. In proton exchange membrane (PEM) type fuel cells, a reactant such as hydrogen is supplied as a fuel to an anode of the fuel cell, and a reactant such as oxygen or air is supplied as an oxidant to the cathode of the fuel cell. The PEM fuel cell includes a membrane electrode assembly (MEA) having a proton transmissive, non-electrically conductive, proton exchange membrane. The proton exchange membrane has an anode catalyst on one face and a cathode catalyst on the opposite face. The MEA is often disposed between porous diffusion media such as carbon fiber paper, which also facilitate a delivery of the reactants.

In a fuel cell stack, a plurality of fuel cells is aligned in electrical series, while being separated by gas impermeable, electrically conductive bipolar plates. Each MEA is typically sandwiched between a pair of the electrically conductive bipolar plates. The bipolar plates have an array of grooves or channels that form flow fields for distributing the reactants over the surfaces of the respective anodes and cathodes. Tunnels are also internally formed in the bipolar plate and distribute appropriate coolant throughout the fuel cell stack, in order to maintain a desired temperature.

It is known to nest the channels in active regions of the fuel cell stacks to reduce the amount of coolant mass, and thereby minimize the overall thermal mass, of the fuel cell stack. For example, fuel cell stacks with nested bipolar plates are described in commonly-owned U.S. Pat. No. 6,974,648 to Goebel and U.S. Pat. No. 7,291,414 to Goebel et al., the entire disclosures of which are hereby incorporated herein by reference. Typically, nested channels do not allow adequate space for diffusion media in the feed or cross-flow regions.

Channels are generally not nested in feed regions of the fuel cell stacks so that reactants may be directed to and from headers of the bipolar plate. It is also known to remove the diffusion media from the feed regions in order to provide further space for fluid flow through the non-nested channels. However, fuel cells with feed regions without diffusion media are unsupported. The unsupported feed regions have created challenges for the design of softgood architecture, as subgasket materials which are thick enough to span weld glands may cause lamination and durability issues for the proton exchange membrane at the edges of the sub-gasket.

The use of diffusion media and shims for seal support in the tunnel regions of the fuel cell stacks is described in U.S. Pat. Appl. Publ. No 2007/275288 to Goebel et al., the entire disclosure of which is hereby incorporated herein by reference. A further known alternative is to have half height channels in the feed regions while retaining diffusion media. However, these designs may result in an undesirable pressure drop in the feed region of the fuel cell stack, where only one channel depth of space is known to exist due to the nesting of channels. With diffusion media in the feed regions, the cross-flow channels must share the available depth of nominally one channel depth, or nominally half the normal channel depth for feed channels in each bipolar plate. The active area is unchanged, however, and consequently has the same pressure drop. Therefore, the increase in pressure drop is within the feed region. The pressure drop scales with hydraulic diameter to the $4^{th}$ power, so the half height channels have a significant impact on pressure drop in the feed region of the fuel cell stack.

There is a continuing need for a system providing membrane support within the feed regions of a nested bipolar plate of a fuel cell stack while minimizing a thermal mass thereof. Desirably, the system also enables a seal on softgoods and facilitates an elimination of a subgasket from the fuel cell stack.

SUMMARY OF THE INVENTION

In concordance with the instant disclosure, a system for providing membrane support within the feed regions of a nested bipolar plate of a fuel cell stack, while minimizing a thermal mass, establishing a seal on softgoods, and facilitating an elimination of a subgasket from the fuel cell stack, is surprisingly discovered.

In a first embodiment, a fuel cell includes a pair of stacked bipolar plates. Each of the bipolar plates has a nested active area and a non-nested feed area. An electrolyte membrane is disposed between a pair of electrodes and a pair of diffusion medium layers. Each of the diffusion medium layers is disposed adjacent the nested active areas of the bipolar plates. Where the diffusion medium layers are disposed adjacent the non-nested feed areas, the non-nested feed areas may also be used as active areas. A porous electrically conductive spacer is disposed between one of the diffusion medium layers and one of the bipolar plates.

In another embodiment, a fuel cell includes a pair of stacked bipolar plates, each having a nested active area and a non-nested feed area. A straight-through reactant tunnel is formed between the pair of bipolar plates. An electrolyte membrane is disposed between a pair of electrodes and a pair of diffusion medium layers. Each of the diffusion medium layers is disposed adjacent the nested active areas of the bipolar plates and is over-molded at a peripheral edge thereof with a polymeric seal. A porous electrically conductive spacer is disposed between one of the diffusion medium layers and the one of the bipolar plates.

In a further embodiment, a fuel cell stack includes a plurality of fuel cells aligned in electrical series in a stack. Each of the fuel cells has a pair of stacked bipolar plates. Each bipolar plate has a nested active area and a non-nested feed area. An electrolyte membrane is disposed between a pair of electrodes and a pair of diffusion medium layers. The diffusion medium layers are disposed adjacent the nested active areas of the bipolar plates. A porous electrically conductive spacer is disposed between one of the diffusion medium layers and the one of the bipolar plates.

DRAWINGS

The above, as well as other advantages of the present disclosure, will become readily apparent to those skilled in the art from the following detailed description, particularly when considered in the light of the drawings described herein.

FIG. 3 is a fragmentary, cross-sectional elevational view of the fuel cell stack taken along section lines indicated by circle 3 depicted in FIGS. 1 and 2, further showing a cathode feed section of the fuel cell stack according to one embodiment of the present disclosure;

FIG. 4 is a fragmentary, cross-sectional elevational view of the fuel cell stack taken along section lines indicated by circle 4 depicted in FIGS. 1 and 2, further showing an anode feed section of the fuel cell stack according to one embodiment of the present disclosure;

FIG. 5 is a fragmentary, cross-sectional elevational view of the fuel cell stack taken along section lines indicated by circle 5 depicted in FIGS. 1 and 2, further showing a coolant feed section of the fuel cell stack according to one embodiment of the present disclosure;

FIG. 6 is a fragmentary, cross-sectional elevational view of the fuel cell stack taken along section lines indicated by circle 6 depicted in FIGS. 1 and 2, further showing an edge section of the fuel cell stack according to one embodiment of the present disclosure;

FIG. 7 is a fragmentary, cross-sectional elevational view of the fuel cell stack taken along section lines indicated by circle 7 depicted in FIGS. 1 and 2, further showing a cathode feed section of the fuel cell stack according to another embodiment of the present disclosure;

FIG. 8 is a fragmentary, cross-sectional elevational view of the fuel cell stack taken along section lines indicated by circle 8 depicted in FIGS. 1 and 2, further showing an anode feed section of the fuel cell stack according to another embodiment of the present disclosure;

Figure 1:
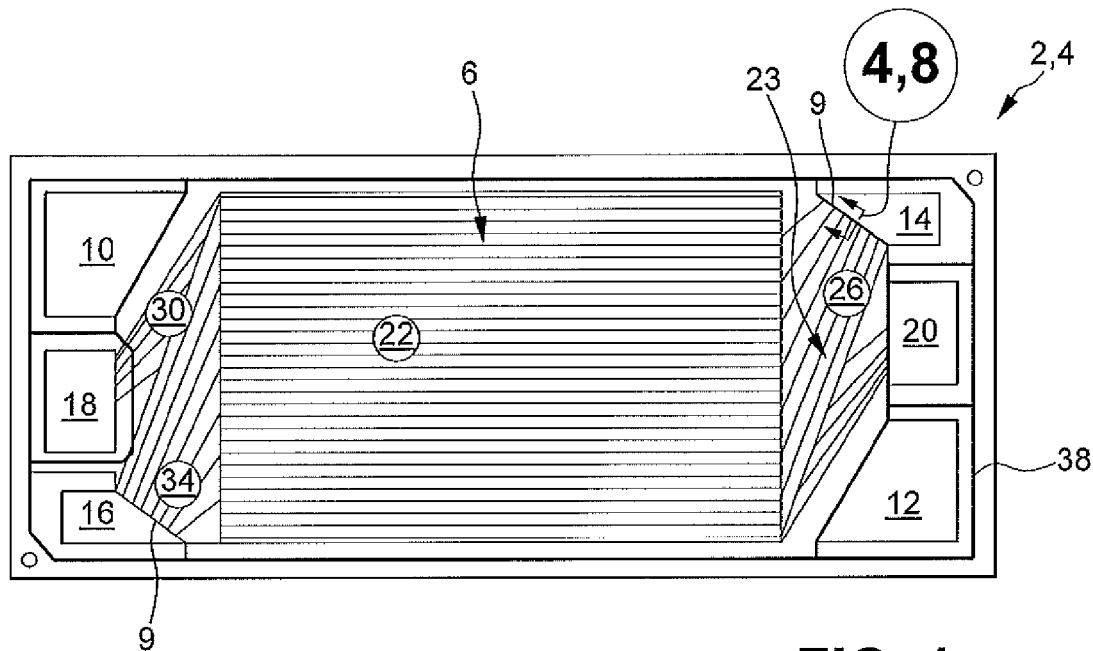
FIG. 1 is a bottom plan view of an illustrative fuel cell stack with nested bipolar plates, showing an anode side of one of the bipolar plates.
Figure 2:
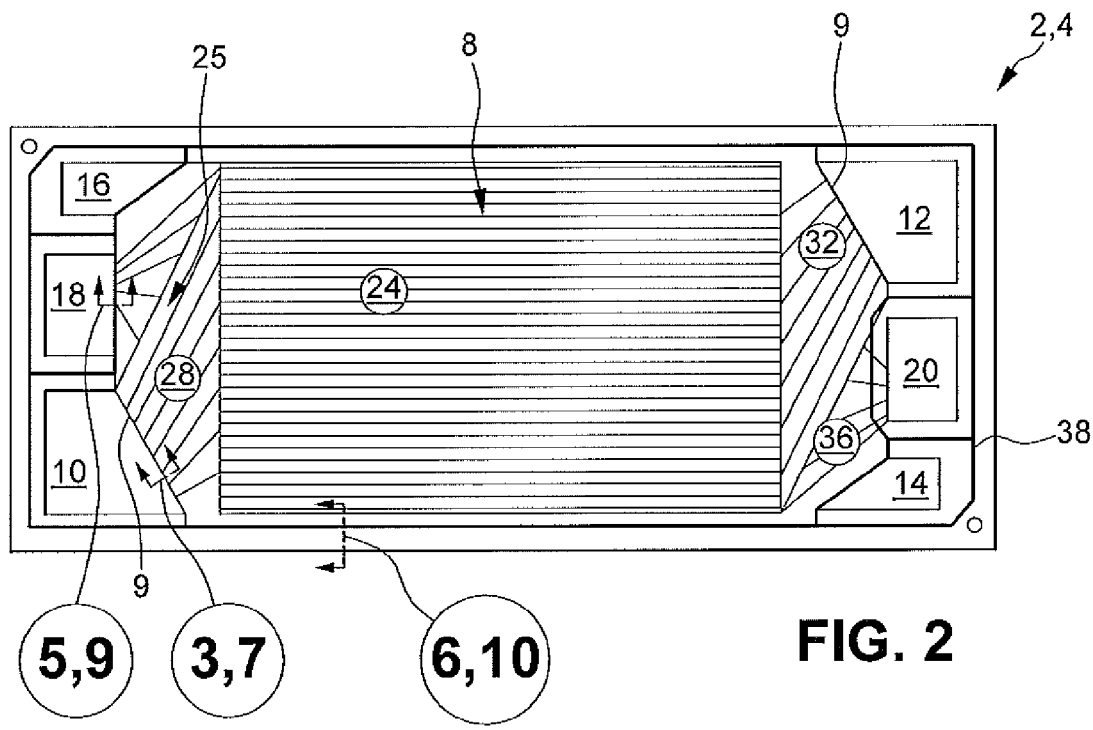
FIG. 2 is a top plan view of the illustrative fuel cell stack depicted in FIG. 1, showing a cathode side of one of the bipolar plates.
Figure 9:
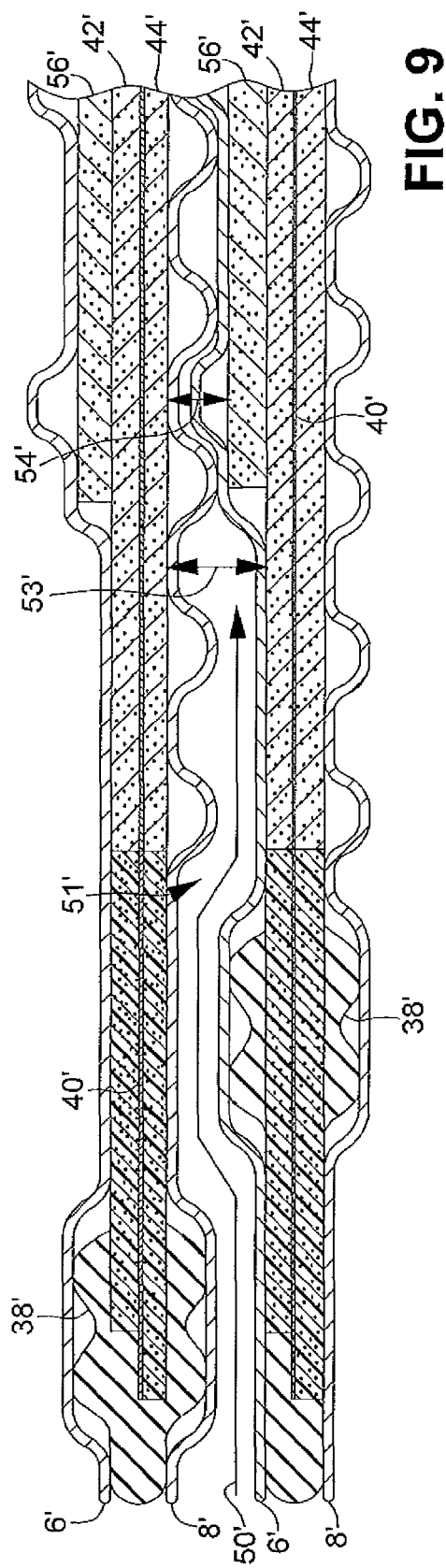
Figure 10:
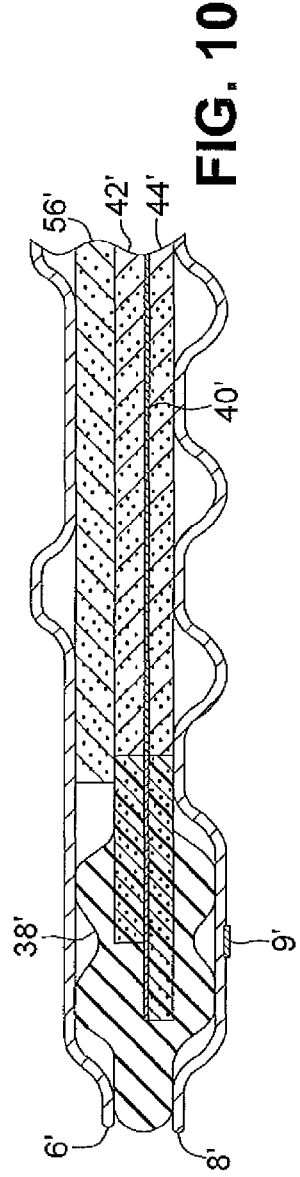

FIG. 9 is a fragmentary, cross-sectional elevational view of the fuel cell stack taken along section lines indicated by circle 9 depicted in FIGS. 1 and 2, further showing a coolant feed section of the fuel cell stack according to another embodiment of the present disclosure; and FIG. 10 is a fragmentary, cross-sectional elevational view of the fuel cell stack taken along section lines indicated by circle 10 depicted in FIGS. 1 and 2, further showing an edge section of the fuel cell stack according to another embodiment of the present disclosure.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

As shown in FIGS. 1-10, the present disclosure includes a fuel cell bipolar plate 2 that facilitates the transportation of reactants and coolant through a fuel cell stack 4. Exemplary fuel cell stacks 4 that may be employed with the bipolar plates 2 of the present disclosure are described in Assignee's co-owned U.S. Pat. No. 6,974,648 to Goebel, U.S. Pat. No. 7,291,414 to Goebel et al., and U.S. Pat. Appl. Publ. No 2007/275288 to Goebel et al., the entire disclosures of which are hereby incorporated herein by reference.

With reference to FIGS. 1 and 2, the bipolar plate 2 includes a first unipolar plate 6, also referred to as an anode plate 6, and a second unipolar plate 8, also referred to as a cathode plate 8. The anode plate 6 has a plurality of flow channels forming an anode side of the bipolar plate 2. The cathode plate 8 has a plurality of flow channels forming a cathode side of the bipolar plate 2. The anode and cathode plates 6, 8 may include welds 9 such as laser welds for securing the anode and cathode plates 6, 8 to one another, such as in the case of anode and cathode plates 6, 8 formed from stamped metal plates. It should be appreciated that electrically conductive composite anode and cathode plates 6, 8 may be employed, as desired. Other means for bonding the anode and cathode plates 6, 8 may also be used.

The bipolar plates 2 of the fuel cell stack 4 include a plurality of apertures 10, 12, 14, 16, 18, 20 formed therethrough. The apertures 10, 12, 14, 16, 18, 20 form manifolds for delivery and exhaust, respectively, of reactants and coolant when a plurality of the bipolar plates 2 is aligned in the fuel cell stack 4. In particular, the bipolar plate 2 includes a cathode inlet aperture 10 and a cathode outlet aperture 12, an anode inlet aperture 14 and an anode outlet aperture 16, and a coolant inlet aperture 18 and a coolant outlet aperture 20. The apertures 10, 12, 14, 16, 18, 20 are formed in respective "header areas" of the bipolar plate 2.

Each of the anode plate 6 and the cathode plate 8 has a nested active area 22, 24 and a non-nested feed area 23, 25. The nested active area 22 is in communication with the anode inlet aperture 14 via an anode feed area 26. The anode feed area 26 has a plurality of channels formed therein. The nested active area 24 is in communication with the cathode inlet aperture 10 via a cathode feed area 28. The cathode feed area 28 also has a plurality of channels formed therein. An interior of the bipolar plate 2 (shown in FIGS. 3 to 10) is in communication with the coolant inlet aperture 18 via a coolant feed area 30, also having a plurality of channels formed therein. Like cathode, anode, and coolant exhaust areas 32, 34, 36 are also provided in communication with the cathode, anode, and coolant outlet apertures 12, 16, 20.

In particular embodiments, substantially the entire active area 22, 24 is provided in a counter-flow configuration, where a cathode reactant stream 46 and a coolant stream 50 flow in a direction counter to an anode reactant stream 48. The coolant stream 50 co-flow with the cathode reactant stream 46 provides a more uniform RH, since a temperature increase provides more water vapor carrying capacity as product water is formed. The counter-flow anode reactant stream 48 also provides a more uniform membrane RH profile by moving humidity from the cathode outlet aperture 12 and carrying the humidity to the cathode inlet aperture 10 by the anode, and similarly for the cathode.

In one embodiment, the bipolar plate 2 includes a polymeric seal 38 formed on each of the anode plate 6 and the cathode plate 8. It should be understood that, although the seal 38 could be on each of the anode and cathode plates 6, 8, the seal 38 may also be disposed on just one of the plates 6, 8 for fewer parts, such as shown in FIGS. 3 to 6, for example. The seal 38 is disposed about the entire perimeter of the bipolar plate 2 and blocks each of the reactants and the coolant from leaking overboard or into the other header areas of the bipolar plate 2. The seal 38 may be disposed atop the weld 9 securing the anode plate 6 to the cathode plate 8, for example. It should be understood that the seal 38 may be staggered adjacent the cathode and anode inlet apertures 10, 14 to allow reacts to pass thereby. Port holes formed in the plates 6, 8 permit the reactants to access the desired side of the plates 6, 8, for example, as shown in FIGS. 3 and 4, to the active areas 22, 24 of the bipolar plate 2. For straight through tunnels, for example, as shown in FIGS. 7 and 8, a thickness of the seal 38' may be omitted to permit the tunnels to pass through.

The fuel cell stack 4 according to the present disclosure includes a membrane 40 sandwiched between a pair of diffusion medium layers 42, 44, such as layers of carbon fiber paper. The membrane 40 and the diffusion medium layers 42, 44 are in turn disposed between a pair of the bipolar plates 2 as described hereinabove. The membrane 40 includes a catalyst, for example, a precious metal-based catalyst such as platinum forming the anode and the cathode in at least the nested active areas 22, 24 of the bipolar plates 2. The membrane 40 extends past the edges of the diffusion medium layers 42, 44 and is wedged between the seal 38 and one of the bipolar plates 2. In other embodiments, the perimeter of the membrane 40 may be covered by sub-gasket or polymer film material, or the sub-gasket material may replace the membrane 40 in the perimeter where only sealing function (i.e., not proton conductivity) is desired.

As shown in FIG. 3, the membrane or sub-gasket perimeter 40 extends past the seal 38 and ends adjacent the cathode inlet aperture 10 in the cathode feed area 28. The cathode reactant stream 46 flows from the cathode inlet aperture 10 through a cathode tunnel 47 to the cathode feed area 28 and then to the nested active area 24 on the cathode sides 8 of the bipolar plates 2. As shown in FIG. 4, the membrane 40 extends past the seal 38 and ends adjacent the anode inlet aperture 14 in the anode feed area 26. The anode reactant stream 48 flows from the anode inlet aperture 12 through an anode tunnel 49 to the anode feed area 26 and then to the nested active area 22 on the anodes sides 6 of the bipolar plates 2. The cathode and anode reactant streams 46, 48 may travel through port holes formed in the bipolar plates 2 from the reactant tunnels 47, 49 to the respective cathode and anode sides of the bipolar plates 2.

In the coolant inlet area 30, as illustrated in FIG. 5, the coolant stream 50 flows through a coolant tunnel 51 between the anode and cathode plates 6, 8, from the coolant inlet aperture 18 to the nested active areas 22, 24 of the bipolar plate 2. It should be appreciated that, in the nested plate design described herein, a first thickness 53 of the non-nested feed area 23, 25 is greater than a second thickness 54 of the nested active area 22, 24. In one example, there is a space equal to about one channel depth in thickness between the diffusion medium layer 42 and the anode plate 6 of the bipolar plate 2 that is caused by the nesting of the channels in the nested active area 22, 24.

In accordance with the present disclosure, an electrically conductive porous spacer 56 is disposed between the diffusion medium layer 42 and the anode plate 6 in the nested active areas 22, 24. As depicted in FIG. 6, the conductive porous spacer 56 may further extend up to the seal 38 adjacent the peripheral edges of the bipolar plates 2. The conductive porous spacer 56 may be integrally formed with the diffusion medium layer 42. In particular embodiments, the conductive porous spacer 56 is a discrete layer disposed adjacent the diffusion medium layer 42. The conductive porous spacer 56 may be formed from the same material as the diffusion medium layer 42, for example, such as carbon fiber paper. As nonlimiting examples, the conductive porous spacer 56 may be formed from one of a metal mesh and a porous metalized composite material. Alternative conductive porous materials having sufficient corrosion resistance under fuel cell environments may also be employed, as desired.

The conductive porous spacer 56 may have a thickness equal to the difference between the first thickness 53 of the non-nested feed area 23, 25 and the second thickness 54 of the nested active area 22, 24. The thickness of the conductive porous spacer 56 may be an uncompressed thickness or a compressed thickness, as desired. In certain embodiments, the conductive porous spacer 56 has an uncompressed thickness up to about 25 percent greater than the difference between the relative first and second thicknesses 53, 54 of the feed areas 23, 25 and the active areas 22, 24. For example, the conductive porous spacer 56 may have an uncompressed thickness of up to about 0.4 mm and the difference between the first thickness 53 of the non-nested feed area 23, 25 and the second thickness 54 of the nested active area 22, 24 may be up to about 0.3 mm. In a particular embodiment, the difference between the first thickness 53 of the non-nested feed area 23, 25 and the second thickness 54 of the nested active area 22, 24 may be up to about 0.18 mm. Other differences in thickness may also be used. The greater thickness of the conductive porous spacer 56 may facilitate a more uniform compression and thereby reduced contact resistance within the fuel cell stack 4 under a mechanical, compressive load. The greater thickness of the conductive porous spacer 56 may further assist in providing a more uniform compression of the membrane 40 within the fuel cell stack 4 for improved membrane durability.

It should be appreciated that the inclusion of the conductive porous spacer 56 adjacent the active area 22, 24 may minimize a pressure drop from the feed area 23, 25. In particular, the presence of the conductive porous spacer 56 permits the extension of the diffusion medium layers 42, 44 into the non-nested feed area 23, 25, thereby providing desirable soft-good support. Where the membrane 40 in the non-nested feed area 23, 25 also has the anode and cathode catalyst disposed thereon, the conductive porous spacer 56 permits a portion of the non-nested feed area 23, 25 to advantageously be used as "active area" within the fuel cell stack 4. The conversion of non-nested feed area 23, 25 to "active area" status may permit the use of fewer bipolar plates 2 in the fuel cell stack 4 while generating the same amount of electrical power.

Where the conductive porous spacer 56 is disposed adjacent the anode side of the bipolar plate 2, a larger thermal and water vapor partial pressure gradient is created on the cathode side of the bipolar plate 2. The gradient causes more product water to move to the cathode side of the bipolar plate 2 where water management is not as critical, primarily since the cathode reactant stream 46 velocity is generally higher than the anode reactant stream 48 velocity. The cathode reactant stream 46 may also be pulsed, if needed. Regardless, a skilled artisan should understand that reactant starvation on the cathode side is not as critical as on the anode side of the bipolar plate 2.

Although the use of the conductive porous spacer 56 to fill the difference in thickness between the active area 22, 24 and the feed area 23, 25 is shown entirely adjacent the anode plate 6, it should be appreciated that the conductive porous spacer 56 may be split between the anode and cathode plates 6, 8, as desired.

FIGS. 7 to 10 show an alternative embodiment according to the present disclosure. Like structure from FIGS. 1 to 6 have the same reference numeral and a prime (') for clarity. The alternative embodiment shows an over-molded or cure-in-place seal 38'. The over-molded or cure-in-place seals 38' may be formed, for example, as disclosed in U.S. Pat. No. 6,423,439 to Barton et al., the entire disclosure of which is hereby incorporated herein by reference. In particular embodiments, the peripheral edges of the diffusion medium layers 42', 44' are imbibed with the polymer of the seal 38', as well as being over-molded.

The fuel cell stack 2' includes the membrane 40' sandwiched between a pair of diffusion medium layers 42', 44', which in turn is disposed between the pair of bipolar plates 2'. The bipolar plates 2' include the anode plate 6' and the cathode plate 8', as described hereinabove. As shown in FIG. 7, the cathode reactant stream 46' flows from the cathode inlet aperture 10' toward the cathode side of one of the bipolar plates 2'. As illustrated in FIG. 8, the anode reactant stream 48' flows from the anode inlet aperture 14' toward the anode side of another of the bipolar plates 2'. As depicted in FIG. 9, the coolant stream 50' flows from the coolant inlet aperture 18' through the interior of each of the bipolar plates 2' to regulate a temperature thereof. The conductive porous spacer 56' is disposed between the diffusion medium layer 42' and the anode side of the bipolar plate 2' adjacent the nested active area 22', 24' thereof. As further shown in FIG. 10, the conductive porous spacer 56' may extend up to the over-molded seal 38' adjacent the side edges of the fuel cell stack 2'. The conductive porous spacer 56' may further overlap the over-molded seal 38'.

As a nonlimiting example, the over-molded seal 38' may be accomplished by extending the membrane 40' and diffusion medium layer 42' to the over-molded or cure-in-place seal 38' that is disposed on and around the edges of the membrane 40' and diffusion medium layer 42'. One of the diffusion medium layers 44' may be longer than another of the diffusion medium layers 42', such that the seal 38' directly abuts the membrane 40'.

In another example, straight-through reactant tunnels 47', 49' may be employed to minimize product water pinning points and odd-even differences of staggered seals 38'. The staggered seals 38' which may still be used for the coolant stream 50', however, as shown in FIG. 9. It should be appreciated that the employment of the conductive porous spacer 56', in conjunction with the over-molded seal 38' and straight-through reactant tunnels 47', 49' thereby permits the construction of the fuel cell stack 4 without using subgaskets.

The employment of the additional electrically conductive porous spacer 56, 56' allows for the diffusion medium layers 42, 42', 44, 44' to be used in the non-nested feed areas 23, 23', 25, 25' without exhibiting an undesirable pressure drop therein. The conductive porous spacer 56, 56' thereby advantageously permits the softgood support provided by the diffusion medium layers 42, 42', 44, 44', while maintaining the low thermal mass associated with nested bipolar plate 2, 2' designs. The conductive porous spacer 56, 56' further facilitates the use of the over-molded seal 38, 38' and elimination of subgaskets that are employed in prior art designs.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell, comprising:
    a pair of stacked bipolar plates, each of the bipolar plates having a nested active area and a non-nested feed area;
    an electrolyte membrane disposed between a pair of electrodes and a pair of diffusion medium layers, each of the diffusion medium layers disposed adjacent the nested active areas and the non-nested feed areas of the bipolar plates, the diffusion medium layers extending into the non-nested feed area; and
    an electrically conductive porous spacer disposed between one of the diffusion medium layers and one of the bipolar plates.

2. The fuel cell of claim 1, wherein the conductive porous spacer has a thickness equal to the difference between a first thickness of the non-nested feed area and a second thickness of the nested active area.

3. The fuel cell of claim 2, wherein the conductive porous spacer has a compressed thickness equal to about a difference between thicknesses of the nested active area and the non-nested feed area of the bipolar plate.

4. The fuel cell of claim 1, wherein the conductive porous spacer has an uncompressed thickness up to about twenty-five percent greater than about one channel depth in the nested active area of the bipolar plate.

5. The fuel cell of claim 4, wherein the conductive porous spacer compresses to about the thickness of one channel depth in the nested active area of the bipolar plate.

6. The fuel cell of claim 1, wherein the conductive porous spacer is a discrete layer formed from a same material as the diffusion medium layers.

7. The fuel cell of claim 6, wherein the diffusion medium layers and the conductive porous spacer are formed from carbon fiber paper.

8. The fuel cell of claim 1, wherein the conductive porous spacer is integrally formed with one of the diffusion medium layers.

9. The fuel cell of claim 1, wherein the conductive porous spacer is a discrete layer formed from one of a metal mesh and a porous metalized composite material.

10. The fuel cell of claim 1, wherein the bipolar plate is formed from a stamped metal plate.

11. The fuel cell of claim 1, wherein each of the diffusion medium layers extends along the non-nested feed areas of the bipolar plates.

12. The fuel cell of claim 11, wherein the electrolyte membrane also includes the pair of electrodes in the non-nested feed areas of the bipolar plates.

13. The fuel cell of claim 1, further comprising another porous electrically conductive spacer disposed between the other of the diffusion medium layers and the other of the bipolar plates.

14. The fuel cell of claim 1, wherein a peripheral edge of each of the diffusion medium layers is over-molded with a polymeric seal.

15. The fuel cell of claim 14, wherein the peripheral edge of each of the diffusion medium layers is imbibed with the polymer of the polymeric seal.

16. The fuel cell of claim 14, wherein one of the diffusion medium layers is shorter than the other of the diffusion medium layers to allow the electrolyte membrane to abut the polymer seal.

17. The fuel cell of claim 1, wherein each of the bipolar plates is formed from a first unipolar plate and a second unipolar plate, the first unipolar plate having channels forming an anode side of the bipolar plate and the second unipolar plate having channels forming a cathode side of the bipolar plate, wherein the porous electrically conductive spacer is disposed adjacent the anode side of the bipolar plate.

18. The fuel cell of claim 1, wherein a straight-through reactant tunnel is formed between the pair of bipolar plates.

19. A fuel cell, comprising:
    a pair of stacked bipolar plates, each of the bipolar plates having a nested active area and a non-nested feed area, wherein a straight-through reactant tunnel is formed between the pair of bipolar plates;
    an electrolyte membrane disposed between a pair of electrodes and a pair of diffusion medium layers, each of the diffusion medium layers disposed adjacent the nested active areas and the non-nested feed areas of the bipolar plates, the diffusion medium layers extending into the non-nested feed area, and the diffusion medium layers being over-molded at a peripheral edge thereof with a polymeric seal; and
    a porous electrically conductive spacer disposed between one of the diffusion medium layers and the one of the bipolar plates.

20. A fuel cell stack, comprising:
    a plurality of fuel cells aligned in electrical series in a stack, each of the fuel cells having a pair of stacked bipolar plates, each of the bipolar plates having a nested active area and a non-nested feed area, an electrolyte membrane disposed between a pair of electrodes and a pair of diffusion medium layers, each of the diffusion medium layers disposed adjacent the nested active areas and the non-nested feed areas of the bipolar plates, the diffusion medium layers extending into the non-nested feed area, and a porous electrically conductive spacer disposed between one of the diffusion medium layers and the one of the bipolar plates.

* * * * *